Nov. 7, 1950  E. P. PALMATIER  2,529,103
SPINNER DEICING SYSTEM
Filed Feb. 13, 1946  2 Sheets-Sheet 1

INVENTOR.
Everett P. Palmatier
BY
Godfrey B. Speir
ATTORNEY

Nov. 7, 1950  E. P. PALMATIER  2,529,103
SPINNER DEICING SYSTEM
Filed Feb. 13, 1946  2 Sheets-Sheet 2

INVENTOR.
Everett P. Palmatier
BY
Godfrey B. Lewis
ATTORNEY

Patented Nov. 7, 1950

2,529,103

UNITED STATES PATENT OFFICE 2,529,103

SPINNER DEICING SYSTEM

Everett P. Palmatier, Solvay, N. Y., assignor to Curtiss-Wright Corporation, a corporation of Delaware Application February 13, 1946, Serial No. 647,249

1 Claim. (Cl. 244—134)

This invention relates to aircraft power plants and is more particularly concerned with improvements in propeller spinners which incorporate an air entrance opening.

In the usual arrangement of an aircraft power plant, a propeller is disposed ahead of the engine and an air entrance opening is provided adjacent the propeller to admit air for consumption by the engine or for cooling purposes. There exists one series of arrangements wherein cooling air is brought through a rotating spinner system associated with the propeller and it is to this series of arrangements that the present invention relates. With the continual need for increased aircraft speed, cowling and air entrances associated therewith must necessarily be constructed with more perfect streamlining, and possibilities of excessive drag either within or without the cowl system must be suppressed. It is an object of this invention to provide an annular rotating cowl system which is substantially free of protuberant components which would tend to increase aerodynamic drag. A further object of the invention is to provide an annular cowl system wherein the icing means, to prevent ice formation on those various cowl components are provided with departs which are subject to impact with the ambient air. A further object of the invention is to provide an aerodynamically clean cowl system, having an annular entrance opening for air, wherein the propeller system will augment the flow of air therethrough and wherein the propeller blade shanks, ordinarily of poor aerodynamic form at their shank ends, will be masked in streamlined housings so as not to interfere with efficient air flow.

Figure 1:
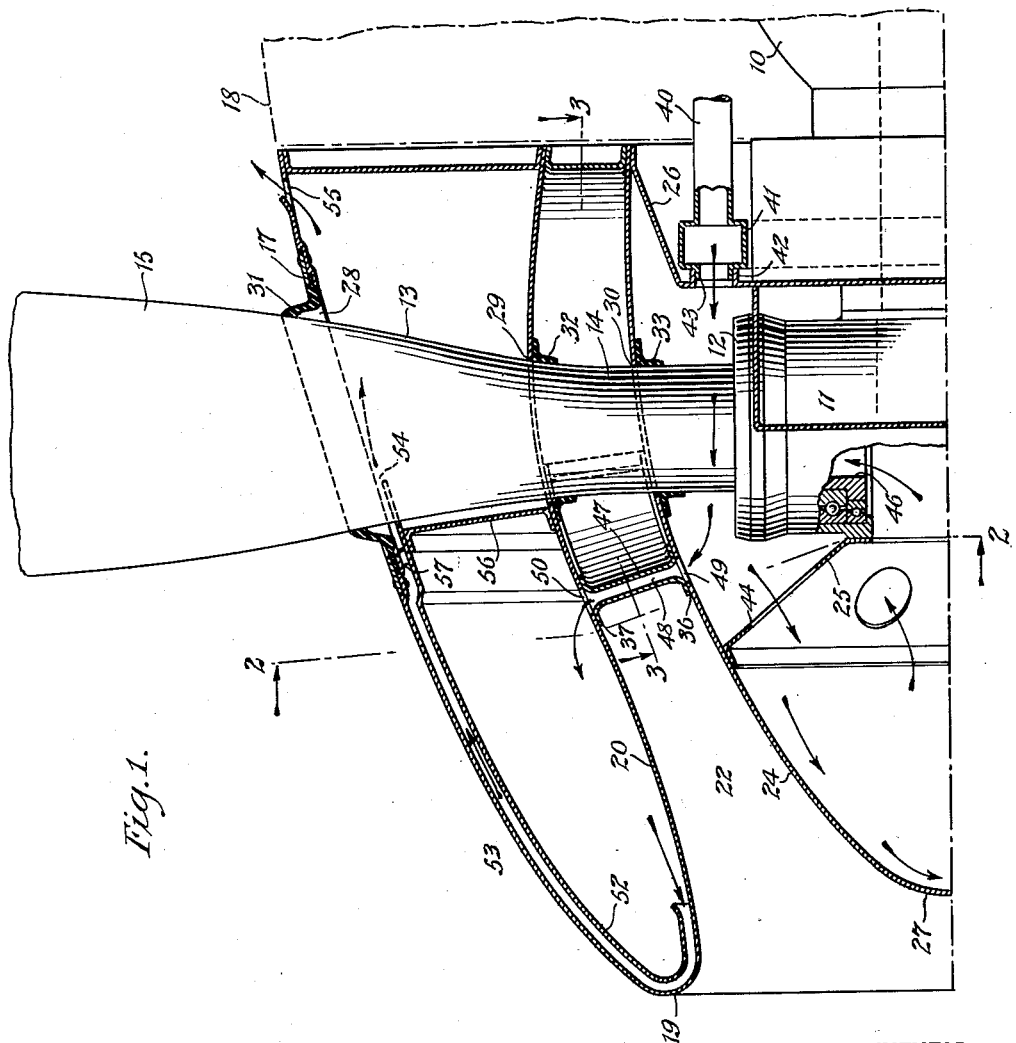
Figure 2:
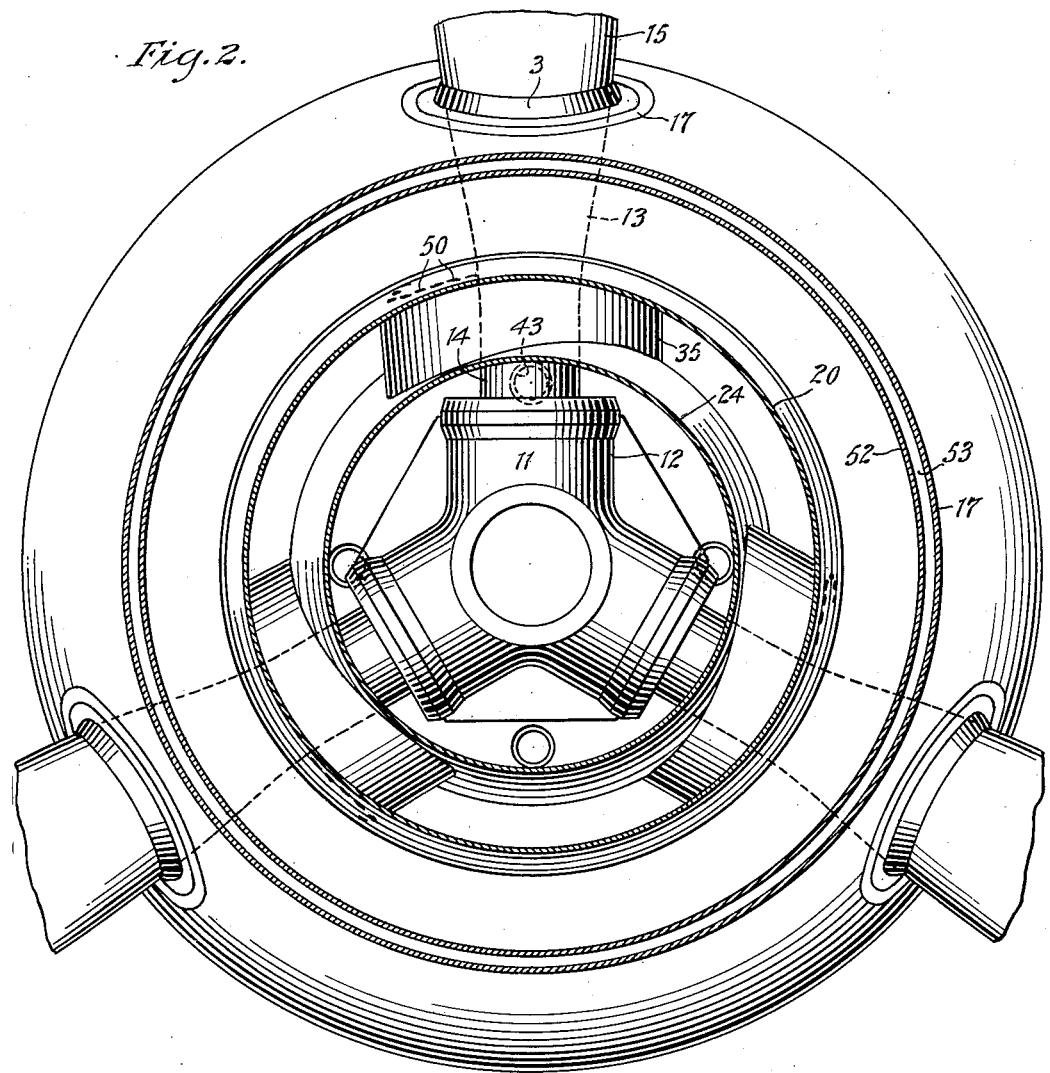
Figure 3:
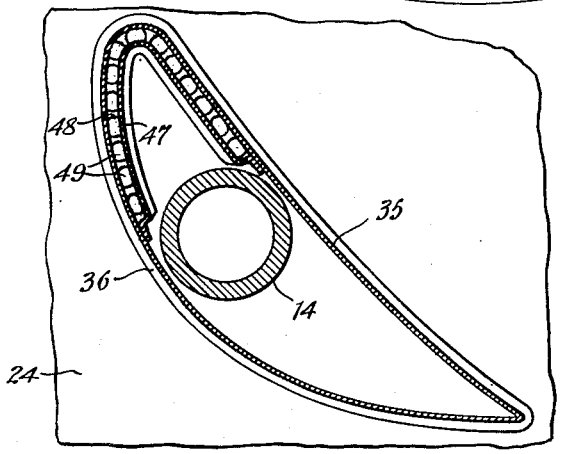

Further objects of the invention will become apparent in reading the annexed detailed description in connection with the drawings, in which Fig. 1 is a longitudinal section on one side of a center line, of an aircraft cowling and propeller system incorporating the features of the invention. Fig. 2 is a complete section of the annular cowling on the line 2—2 of Fig. 1 and Fig. 3 is a section on the line 3—3 of Fig. 1.

As basic structure, old in the art, I show an engine nose 10 to the forward end of which is secured a propeller hub 11 having blade sockets 12 from which project propeller blades 13, the propeller blades being rotatable in pitch in the hub sockets by means well known in the art. As is conventional in controllable pitch propellers, the inner shank portions of the blades, as at 14, are substantially circular in cross-section or have slightly pitched configuration and as the blade extends outwardly, it reaches airfoil form as at 15.

To provide the greatest possible degree of aerodynamic cleanness in the propeller-cowling assembly, it is desirable to mask the unpitched portions of the propeller blades and to have only the effective pitched portions thereof in the stream of the relative air. To this end, the prior art has shown arrangements of cuffs which embrace the inner unpitched portions of the propeller blades. However, in the present invention, I provide a rotating cowl system whose outside diameter is sufficient to encompass the unpitched blade portions, this cowling comprising an outer cowl member 17 which forms a streamlined forward prolongation of the cowling of the aircraft body such as 18. This outer cowl 17 extends forwardly to a leading edge 19 and then sweeps inwardly as at 20 to define an annular air passage from the rear portion of which air may pass to the power plant system whose details are not shown. To provide minimum interference with air flow through the passage 22 defined by the inner cowling 20, I provide a spinner 24 which embraces the propeller hub 12 and is supported thereon by diaphragm members 25 and 26. The forwardmost point of the spinner 24, as at 27, is preferably disposed to the rear of the leading edge 19 of the cowl 17 to provide an area for entrainment of ambient air which will subsequently pass through the annular passage 22.

Appropriate openings 28, 29 and 30 are provided in the cowl elements 17 and 20 and in the spinner element 24, respectively, for passage of the propeller blades and if desired, sealing grommets 31, 32 and 33 may be provided at the respective openings 28, 29 and 30 to seal the blades in their passage through the elements the grommets being arranged to allow blade pitch change while maintaining sealing relationship. It will be seen that a part of the shank of the blade 14 lies within the annular air passage 22 and since this is an unpitched portion of the blade, it would provide high drag interference in the flow of air through the passage 22. To overcome this, I arrange a hollow cuff 35 between the spinner 24 and the inner cowl 20, secured at its ends to both said elements. Said cuff embraces each blade shank and is formed as an elongated airfoil element to have minimum drag. Furthermore, the cuff 35 is pitched to such an extent that it will normally have a fan-like pumping effect to augment the flow of air through the passage 22.

The cuff elements 35 are of fairly rugged construction, and by their attachment as at 36 and 37 to the spinner 24 and to the inner cowling 20, they provide spokes for the structural support of the outer cowl 17—20 to hold it in coaxial relation with the propeller during rotation of the propeller system.

It will be seen that by the configuration of the outer cowl 17—20, the spinner 24 and the cuff elements 35, an aerodynamically clean blower cowl installation is provided which has a minimum drag and which has an axial air entrance for engine air requirements, the air flow through the spinner and cowl system being augmented by the pitched cuff arrangement. Furthermore, it will be seen that the propeller blades having clearance relation with the spinner, cuff, and cowling, are free to rotate in pitch and present effective aerodynamically formed portions of the blades exteriorly of the cowling, to increase effectiveness of the propeller in conjunction with the cowl system.

Means for effectively de-icing the cowl and spinner system are also provided. The de-icing is preferably accomplished by the admission of hot gas—either exhaust gas or heated air—to the spinner system through a pipe 40, secured to the engine, which registers with an annular manifold 41 having an annular transfer passage 42 connecting with a coacting annular element 43 formed in the spinner support diaphragm 46. The hot medium is admitted to the interior of the spinner whence it flows to the front thereof through openings 44 in the front spinner support diaphragm 45 and thence into the hollow propeller blade shanks as at 46. A masking element 47 is disposed in closely spaced relation to the leading edge portion of each cuff 35 so that a space 48 is formed between the cuff leading edge and the element 47. A plurality of holes 49 are formed in the spinner in alignment with the passage 48 and a plurality of holes 50 are provided in the cowl 20 in alignment with passage 48, so that hot medium may flow from the interior of the spinner through the passages 48 into the hollow defined between the cowl elements 17 and 20. The passage of hot medium through the cuffs warms their leading edges to prevent the formation of ice. The hot medium flowing into the outer hollow cowl is directed along the leading edge thereof by a baffle 52 closely spaced to define an annular passage 53 so that the hot medium will raise the temperature of the cowling to an extent sufficient to prevent the formation of ice thereon. The hot medium may pass from the passage 53 as at 54 and thence issues from the cowling 17 through louvers 55 near the rear portion of the cowling. To prevent recirculation of the hot medium within the cowling, a baffle 56 may be provided between the rear portion of the element 52 and inner portion of the cowl 20. This baffle 56 likewise provides reinforcing structure for the outer part of the cowling by means of struts 57 bridging the passage 53 and secured to the cowling 17.

By stratifying the flow of hot de-icing medium through the cuffs and along the surface of the outer cowl 17, much more efficient usage is made of the medium than would otherwise occur, and a smaller amount of hot medium will serve to prevent icing than would be needed if the hot medium were allowed free circulation through the entire system.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

What is claimed is:

In an aircraft power plant, a rotating propeller system comprising a propeller hub having variable pitch blades extending therefrom, a spinner embracing the hub having openings through which said blades pass in clearance relation, an annular cowl around the spinner, open at its forward end, defining with said spinner an annular air passage across which the propeller blades pass, said cowl having openings through which said blades pass in clearance relation, cuff elements within said passage embracing the blade portions passing thereacross in clearance relation, means within said cuff elements defining narrow passages within the leading edges thereof and of which passages the cuff leading edge forms a defining wall, means to seal the blades relative to the exterior surface of said cowl, said spinner and cowl being hollow and in communication with the passages of said cuff elements, and means to feed a hot medium into said spinner hollow for series flow from the spinner hollow, through said cuff passages and into said cowl hollow for de-icing purposes.

EVERETT P. PALMATIER.

REFERENCES CITED

The following references are of record in the file of this patent:

UNITED STATES PATENTS

| Number | Name | Date |
|---|---|---|
| 1,414,418 | Jaray | May 2, 1922 |
| 1,907,454 | Squires | May 9, 1933 |
| 1,908,820 | Chilton | May 16, 1933 |
| 2,125,187 | Lansing | July 26, 1938 |
| 2,274,743 | Rosskopf | Mar. 3, 1942 |
| 2,313,491 | Lemoigne | Mar. 9, 1943 |
| 2,329,606 | Goodman | Sept. 14, 1943 |
| 2,330,622 | Ramshorn | Sept. 28, 1943 |

FOREIGN PATENTS

| Number | Country | Date |
|---|---|---|
| 543,219 | Great Gritain | Feb. 16, 1942 |
| 871,408 | France | Jan. 15, 1942 |
| 882,069 | France | Feb. 15, 1942 |